(12) United States Patent
Whitehead et al.

(10) Patent No.: US 7,316,531 B2
(45) Date of Patent: Jan. 8, 2008

(54) MULTI-USE TRAILER WITH PIVOTABLE BUNK HARDWARE

(75) Inventors: Jerald M Whitehead, Boise, ID (US); Michael E Banks, Boise, ID (US)

(73) Assignee: Western Trailer Co., Boise, ID (US)

( * ) Notice: Subject to any disclaimer, the term of this patent is extended or adjusted under 35 U.S.C. 154(b) by 261 days.

(21) Appl. No.: 11/207,389

(22) Filed: Aug. 18, 2005

(65) Prior Publication Data

US 2007/0041803 A1 Feb. 22, 2007

(51) Int. Cl.
B60P 7/12 (2006.01)
(52) U.S. Cl. ...................................... 410/37
(58) Field of Classification Search ................. 410/31, 410/32, 34, 36, 37
See application file for complete search history.

(56) References Cited

U.S. PATENT DOCUMENTS

| | | | | |
|---|---|---|---|---|
| 4,097,058 A | * | 6/1978 | Hassell | 280/145 |
| 4,188,042 A | * | 2/1980 | Pederson et al. | 280/404 |
| 4,700,985 A | | 10/1987 | Whitehead | |
| 4,966,383 A | | 10/1990 | Sjostrom | |
| 5,110,149 A | * | 5/1992 | Dahlstrom | 280/401 |
| 5,127,663 A | * | 7/1992 | Whitehead | 280/404 |
| 5,163,698 A | * | 11/1992 | Evens | 280/404 |
| 5,308,216 A | * | 5/1994 | Herolf | 414/550 |
| 5,611,286 A | * | 3/1997 | Liermann | 105/389 |
| 5,911,467 A | | 6/1999 | Evans et al. | |
| 5,993,126 A | | 11/1999 | Janzen | |
| 6,050,578 A | * | 4/2000 | Beck | 280/86.5 |
| 6,145,863 A | | 11/2000 | Brown | |
| 6,149,360 A | * | 11/2000 | Billotte | 410/37 |
| 6,183,036 B1 | | 2/2001 | Coulson | |
| 6,299,395 B1 | * | 10/2001 | Eriksson | 410/37 |
| 6,495,774 B1 | * | 12/2002 | Pederson | 177/136 |
| 6,537,008 B1 | * | 3/2003 | Haring | 414/24.5 |

* cited by examiner

*Primary Examiner*—H Gutman
(74) *Attorney, Agent, or Firm*—Christensen O'Connor Johnson Kindness PLLC

(57) ABSTRACT

A trailer (100) is disclosed having a trailer bed (106) that may be a drop center type trailer and a frame structure extending, including a forward frame (120), rearward frame (122) and upper beam (124) therebetween. Pivotable bunk assemblies (150, 160) having left and right portions are pivotably mounted to the trailer side rails (105), the bunk portions pivotable between a deployed position extending over the trailer and a non-deployed position. A top frame (130) is hingedly attached to the upper beam and engages the bunk assemblies when it is in the closed position. Deployable, load-bearing sidewalls (102) are also optionally provided. The trailer is easily convertible between a configuration suitable for hauling logs in the deployed bunk assemblies and a configuration suitable for hauling other product—for example, wood chips or the like—with the bunk assemblies non-deployed, and the sidewalls deployed.

30 Claims, 9 Drawing Sheets

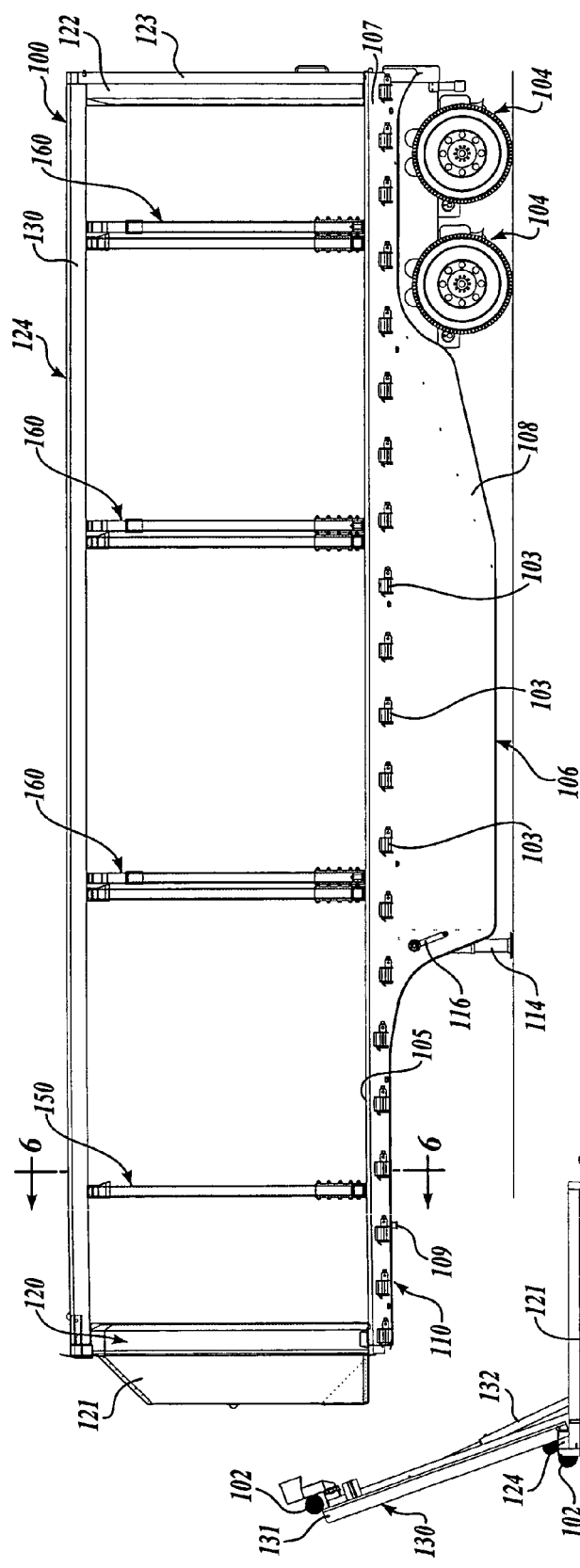
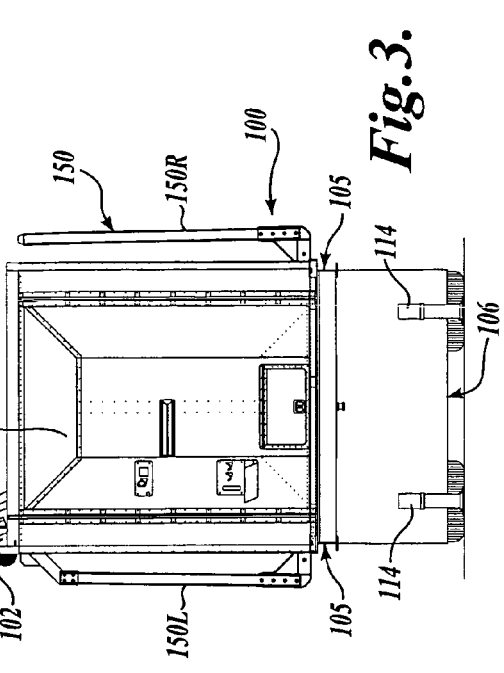
Fig.2.
Fig.3.

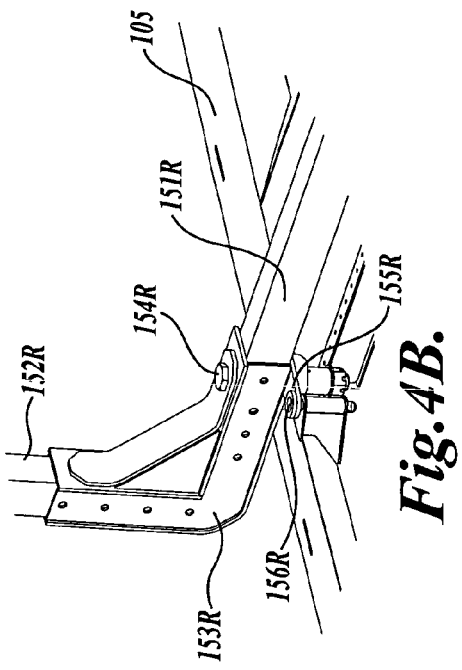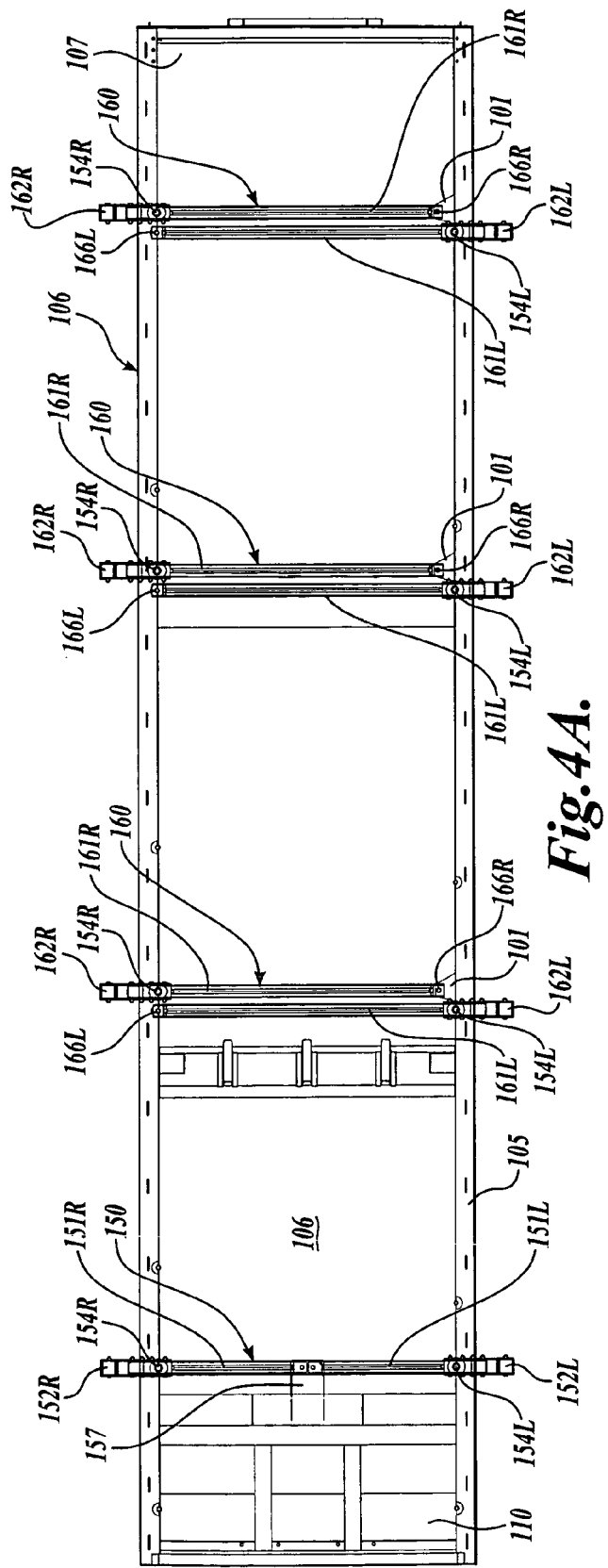

MULTI-USE TRAILER WITH PIVOTABLE BUNK HARDWARE

FIELD OF THE INVENTION

The present invention is in the field of commercial trailers and, in particular, to trailers that are suitable for use in the timber industry.

BACKGROUND OF THE INVENTION

Trailers for hauling logs and similar elongate products typically include a flat trailer bed having two or more bunk assemblies for retaining the logs. The bunk assemblies are U-shaped, upwardly extending supports having a lower horizontal portion (a "bunk") and oppositely-disposed upright portions ("stakes"). The logs or other elongate products are typically set or dropped onto the bunks between the opposing stakes. Frequently, straps or other binding elements are secured about the logs to further secure the load.

Trailers for hauling commodity products such as wood chips and the like, however, are quite different from conventional log-hauling trailers and are more box-like, typically including a trailer bed with rigid sidewalls that extend upwardly from the bed to define a generally-confined volume that can be filled with product. Frequently, the trailer bed includes portions that extend downwardly, between forward and rearward axles, to increase the volumetric capacity of the trailer.

In many applications, such as in the logging industry, the trailers may be separable trailers that may be releasably attachable to a driven vehicle through a fifth wheel type attachment, or trailer bed portions that are formed as an integral part of a truck. In particular, as used herein, the term "trailer" is hereby defined to include both separable trailers that are adapted to be removably attached to a motor vehicle such as a truck tractor, and integral trailer or load carrying portions of trucks.

In either type of trailer, it is typical for the trailer to be loaded at one location, transport products to a distant second location, then return empty to the first location to receive another load for transport to the second (or another) location. Obviously, it is inefficient to transport the empty truck back to the first location.

To maximize efficient use of labor and fuel in the ground freight industry, independent truckers and trucking companies are constantly in search of loads to minimize financial loss due to unwanted transportation of an empty truck. A return trip of an empty truck or any empty leg of a multiple-point haul is costly in terms of fuel and labor. In the logging industry, empty return trips are common due to an inability of prior art logging trailers to carry any load other than cut timber. Prior art logging trailers typically transport cut timber to saw mills. Due to the construction of prior art logging trailers having fixed bunks, prior art logging trailers are unable to haul wood residuals or another type of load.

For a number of reasons, global wood residual production has increased dramatically. Nearly all wood residuals are used to produce other products, primarily paper, non-structural panels, and fuel. It is expected that the amount of wood residues produced yearly will continue to increase due to the changing character of global timber production and advances in engineering that are constantly providing new uses for wood residuals. The nature of wood resources globally is changing toward smaller trees, nontraditional species of trees, or genetically-modified species that are generally considered to be less desirable for traditional lumber production. Accordingly, engineering advances over recent years have increased the ability for wood residuals to be formed into buildable lumber products usable for construction. Due to the increased production and demand for wood residuals, there exists a need for apparatuses and methods that can facilitate the transportation of both whole cut timber and wood residuals such as bark, chips, and the like.

Accordingly, there exists a need for apparatuses and methods whereby trailers used for hauling logs may also be used for hauling other products to provide operators with greater flexibility in utilizing such trailers and related resources efficiently.

SUMMARY OF THE INVENTION

A trailer that is suitable for hauling elongate product such as logs, and for hauling commodity products such as wood chips, is disclosed. The trailer includes a trailer bed mounted on one or more axles. The trailer bed may optionally be of the drop center, or "possum belly" type. Deployable bunk structures that include a left bunk assembly and a right bunk assembly are pivotably mounted on the left and right side rails of the trailer. When deployed, the left and right bunk assemblies form a U-shaped structure that extends across the trailer bed. When non-deployed the left and right bunk assemblies are disposed essentially over the left side rail and right side rail of the trailer such that the bunk structures do not overlie the trailer bed.

In the currently embodiment the left and right bunk structures include a horizontal bunk and an upright stake, and at least some of the horizontal bunks extend from one side rail to the other when the bunk assemblies are deployed. The bunk assemblies may include means for deploying. The bunk assemblies may also include a locking pin to selectively lock the bunks in the deployed and/or non-deployed positions.

In another aspect of the invention, the trailer includes a frame structure attached to the trailer bed. The frame includes a main upper beam extending longitudinally from the front of the frame portion to the back. A pair of flexible side walls, such as load-bearing curtains, is preferably mounted to the frame, and a number of winches are provided on the trailer bed to secure the side walls when they are in use.

In an embodiment of the invention, a top frame is pivotably attached to the main upper beam of the frame structure, and an optional actuator, such as a hydraulic, pneumatic or electric system, is provided for opening and closing the top frame is provided. The top frame may include pivotable members that engage the upper end of the bunk assembly stakes when the top is closed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a side view of the rearward trailer shown in FIG. 1, with the deployable sidewalls retracted and showing the bunks in the deployed position for receiving logs;

FIG. 3 is a front view of the trailer shown in FIG. 2, with the top frame pivoted to up position;

FIG. 4A is a plan view of the trailer shown in FIG. 2, with the top frame and related hardware removed to better show aspects of the trailer;

FIG. 4B is a perspective detail of the trailer shown in FIG. 2, showing a pivotable bunk connection;

DETAILED DESCRIPTION

Figure 1:
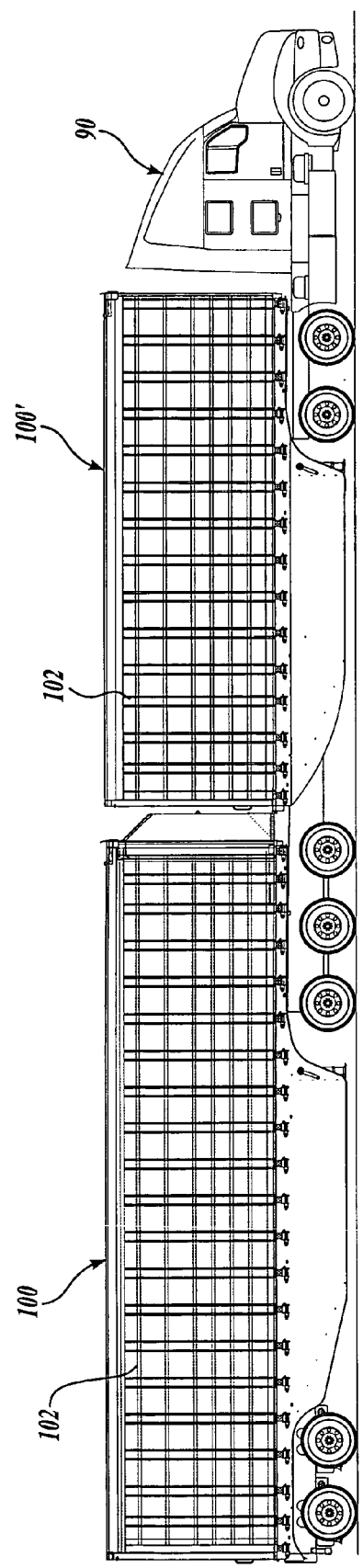
FIG. 1 shows a side view of a tandem trailer made in accordance with the teachings of the present invention and attached to a tractor, wherein the trailers are configured for hauling bulk products such as wood chips.

A detailed description of the current embodiment of a trailer according to the present invention will now be described, with reference to the figures, wherein like numbers indicate like parts. FIG. 1 shows a side view of a pair of trailers 100, 100' pulled in tandem by a conventional tractor 90. Although the currently preferred embodiment of the trailers 100, 100' is shown as a separable trailer, it will be appreciated that the trailer portion may alternatively be formed as a permanent part of the truck. The trailers 100, 100' of this embodiment include flexible, load-bearing curtains or sidewalls 102 that extend along the length of the trailers 100, 100', as are known in the art. An example of an exemplary flexible sidewall is disclosed, for example, in U.S. Pat. No. 4,700,985, No. 5,911,467, and No. 6,183,036, which are hereby incorporated by reference.

FIG. 2 shows a side view of the rearward trailer 100 in isolation. The trailer 100 includes tandem rear axles 104 mounted beneath a rearward end 107 of a trailer bed 106. Although tandem axles 104 are shown, it will be apparent that the present invention may be practiced with trailers having more or fewer axles. In the disclosed embodiment, the trailer bed 106 is a drop center style (sometimes referred to as a "possum belly" or "drop belly" trailer), perimeter frame trailer with no cross members. The drop center trailer bed 106 in the disclosed embodiment includes side rail portions 105 and a downwardly extending open volume portion 108 forward of the rear axles 104, providing extra load (volume) carrying capacity. The extra volume is beneficial, for example, for transporting relatively less dense commodity product such as wood chips.

The forward end 110 of the trailer bed 106 is approximately at the same vertical level as the rearward end 107 and includes a kingpin 109 on its underside, adapted to engage a fifth wheel (not shown) of the tractor 90 or forward trailer 100' in a tandem trailer configuration. Extendable support legs 114 are provided such that the trailer 100 can be self-supported by the rear axles 104 and the support legs 114. The support legs 114 are deployed and retracted using a conventional support leg crank 116.

A structural frame assembly extends upwardly from the trailer bed 106 and includes a forward frame portion 120 that is rigidly attached to the trailer bed 106, a rearward frame portion 122 also rigidly attached to the trailer bed 106, and a rigidly attached main upper beam 124 that extends from an upper corner of the forward frame portion 120 to a corresponding upper corner of the rearward frame portion 122. A pivotable top frame 130 is hingedly attached to the main upper beam 124, as discussed in more detail below. A forward panel member 121 is attached to the forward frame portion 120 and may be adapted to house certain trailer utilities such as a hydraulic or pneumatic system. In certain preferred embodiments, a rearward panel member 123 is hingedly attached at an upper end to the rearward frame portion 122 to facilitate dumping wood chips or other commodities from the trailer 100. Although the disclosed rearward panel member 123 is hingedly attached at an upper end, it is believed that in some applications it will be more advantageous to attach one or more rear panels in an alternative manner, for example the rear panel member may alternatively comprise a pair of half-width panels or doors hinged to the rearward frame portion 122 along outer vertical axis. Alternatively, other retractable doors may be utilized, as are well-known in the art.

Refer now also to FIG. 3, that shows a front view of the trailer 100 with the pivotable top frame 130 in the "open" position. The pivotable top frame 130 may include a lifting system—for example, utilizing hydraulic, electric, or pneumatic actuators 132—to move the top frame 130 between the open and closed positions. Alternatively, a cable or other engageable member (not shown) may be attached near the distal edge 131 of the pivotable top frame 130, whereby an external apparatus—for example, a loader or the like—can move the top frame 130 between the open and closed positions. Left and right deployable curtains or sidewalls 102 are shown in the retracted position on either side of the top frame 130. A plurality of winch assemblies 103 (FIG. 2) is provided below the side rail portions 105 of the trailer bed, the winch assemblies 103 being adapted to receive and tighten straps (not shown) on the deployable sidewalls 102.

The trailer 100 further includes a plurality of pivotable bunk assemblies 150, 160 that are mounted to the side rail portions 105 of the trailer bed 106 and pivot between the deployed position shown in FIGS. 2 and 3, and a non-deployed position wherein the bunk assemblies 150, 160 are substantially directly over the side rail portions 105, without extending transversely over the trailer bed 106.

The pivotable bunk assemblies 150, 160 will now be described in more detail and with particular reference to FIG. 4A, which shows a plan view of the trailer 100 with the top frame 130 and related hardware removed for clarity. The first bunk assembly 150 is shown in the deployed position and is located near the forward end 110 of the trailer bed 106, and includes left and right bunk assemblies. The left and right bunk assemblies are generally L-shaped and include a horizontal bunk 151L, 151R, respectively, and an upright stake 152L, 152R, respectively (wherein the "L" and "R" designators indicate left and right bunk assembly elements, respectively). As seen most clearly in the fragmentary detail of the right bunk assembly shown in FIG. 4B, the bunks 151L, 151R (151R shown) may connect to the corresponding stake 152L, 152R with a flanged, L-shaped tubular connector 153R. The left and right bunk assemblies pivotably connect to near an inner edge of the side rail portions 105 with a pivot pin 154L and 154R, respectively. As seen most clearly in FIG. 4B, the connector 153R may include a locking flange 155R that is adapted to receive a second pivot pin 156R to releasably lock the bunk assembly in the deployed position. An upright member 157 extends upwardly from about the center of the shallow forward end 110 of the trailer 106 to provide a support for the distal end of the bunks 151L and 151R when the bunk assembly 150 is in the deployed position.

The second bunk assemblies 160 are similar to the first bunk assembly 150 and also include L-shaped left and right bunk assemblies having transverse bunks 161L, 161R, respectively, and upright stakes 162L, 162R. The bunks 161L and 161R may be connected to corresponding stakes 162L, 162R with an L-shaped connector (not shown) similar to the connector 153R described above. The left and right bunk assemblies pivotably connect to near an inner edge of the side rail portions 105 with a pivot pin 154L and 154R, respectively. In the second bunk assemblies 160, the bunks 161L and 161R are longer and extend substantially across the width of the trailer bed 106 when the bunk assemblies 160 are in the deployed position shown in FIG. 4A. The left bunks 161L extend to the opposite side rail portion 105 where they may be pinned through aperture 166L to lock the bunk 161L from pivoting during use. A flange 101 is fixedly attached to the left side rail portion 105 to receive the right bunk 161R, and the right bunk 161R may be pinned through aperture 166R.

Figure 5:
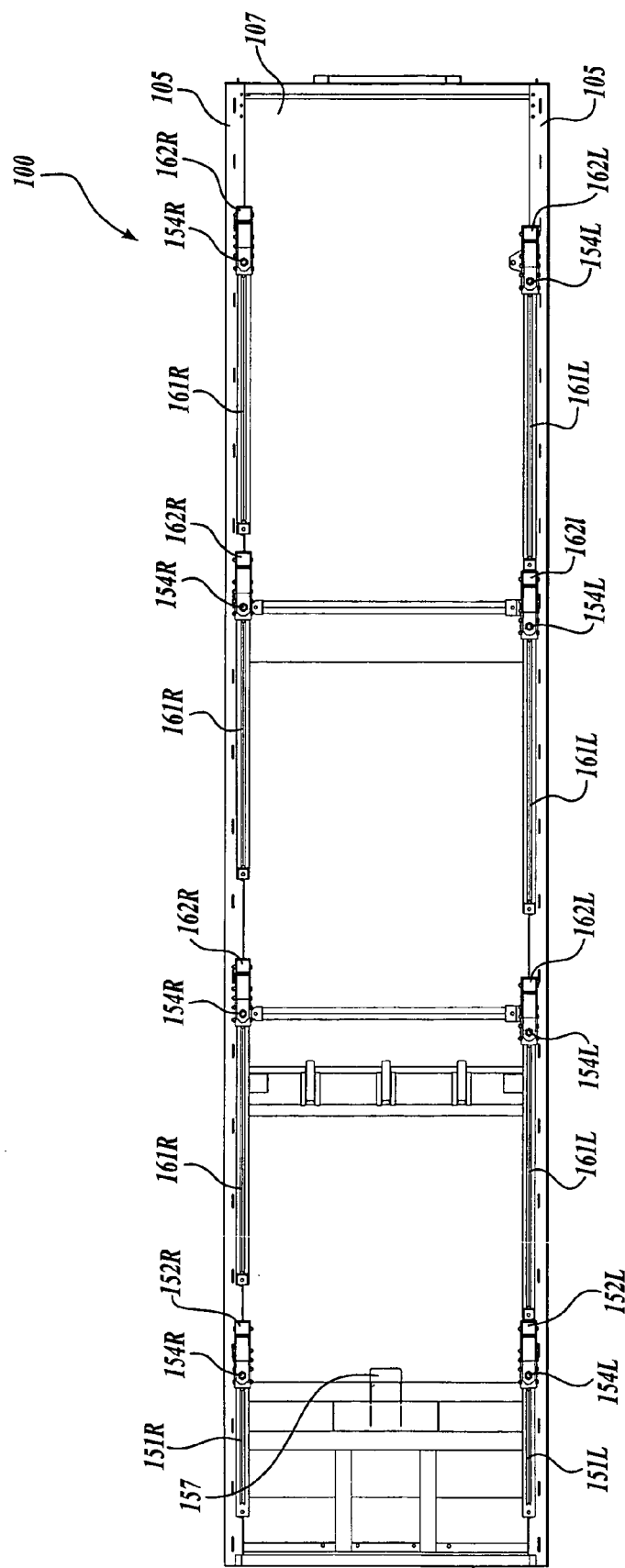
FIG. 5 is a plan view of the trailer shown in FIG. 2, with the top frame removed for clarity and with the bunk assemblies in the non-deployed position.

Refer now to FIG. 5, which shows a plan view of the trailer 100 with the top frame 130 and related hardware removed, similar to FIG. 4A, but with the bunk assemblies 150, 160 pivoted approximately ninety degrees (90°) about pivot pins 154L, 154R to a non-deployed position. In the non-deployed position, the bunks 151R, 151L, 161R, 161L lie over an inner edge of the respective side rail members 105 and, therefore, will not interfere with cargo such as wood chips that may be loaded in the trailer bed 106. It will also be appreciated that the upright stakes 152R, 152L, 162R, 162L move inwardly to also overlie an inner portion of the side rail portions 105. Locking pins may be inserted through apertures in the distal end of the bunks 151R, 151L, 161R, 161L (and corresponding apertures in the side rail portions 105) to lock the bunk assemblies 150, 160 in the non-deployed position.

It will be appreciated that, in the disclosed embodiment, the pivoting bunk assemblies 150, 160 provide a retaining width (i.e., the distance between the stakes 152L, 152R and 162L, 162R) that is significantly wider than the trailer bed 106. This can be desirable in the logging industry—for example, when relatively light logs are being transported and the extra volumetric load capacity is desirable to achieve the gross weight limit. It is contemplated, however, that the invention can be practiced wherein the upright stakes 152L, 152R, 162L, 162R are disposed much closer to the bunk pivot point, such that the deployed bunk assemblies are not significantly wider than the trailer bed 106. This may be desirable in jurisdictions wherein the maximum width of the trailer is more strictly proscribed.

It will also be appreciated that although the current embodiment includes two pivotable bunk portions for each bunk assembly, it will be readily apparent that the invention may be practiced wherein one of the bunk assemblies is pivotable, and the other is fixedly, or nonpivotably mounted to the trailer bed 106. It is also contemplated that the bunks 161R, 161L may alternatively extend only part way across the trailer bed 106 (for example, similar to bunks 151R, 151L), particularly in embodiments utilizing a flat bed trailer.

Figure 6:
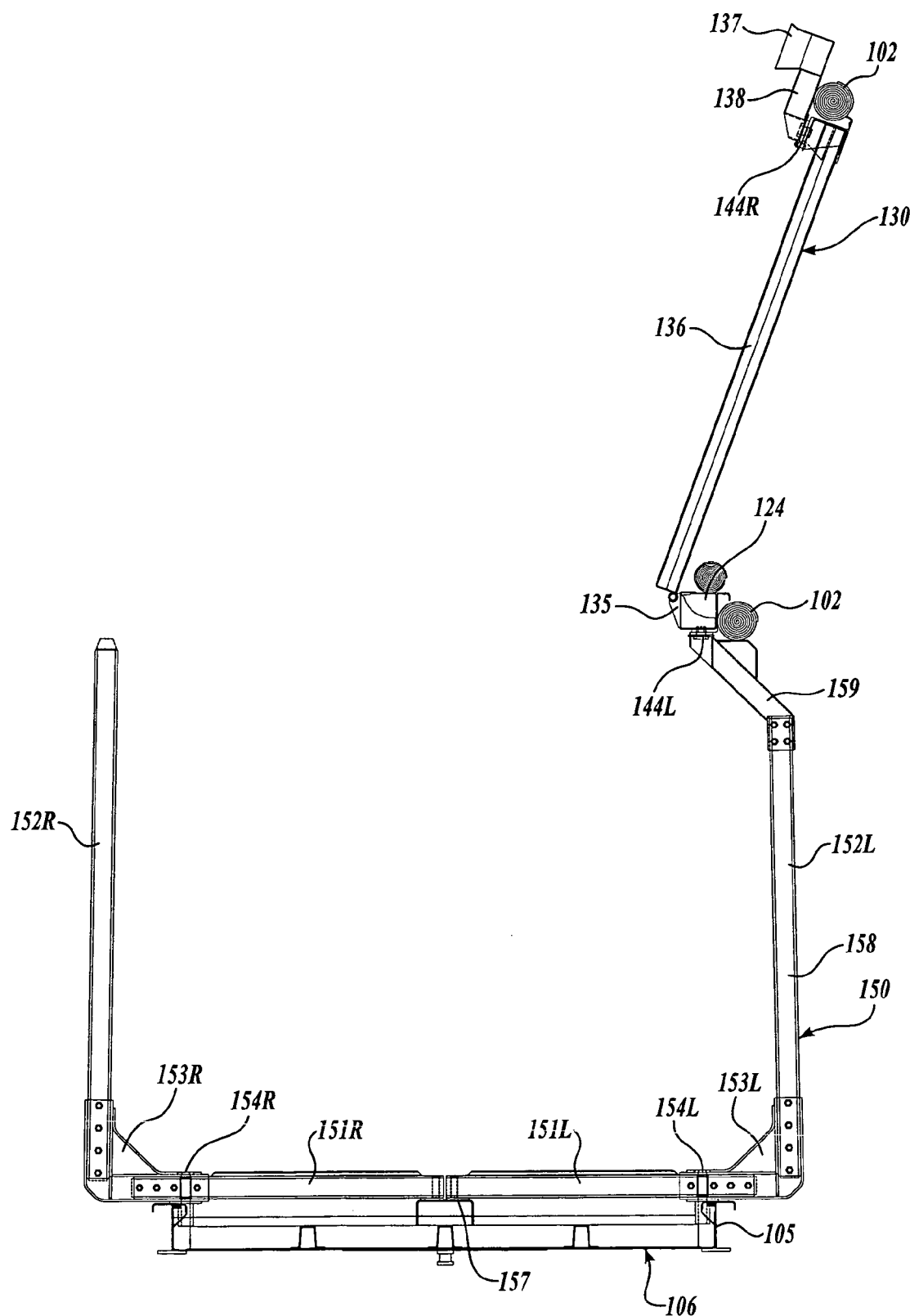
FIG. 6 is a cross-sectional view through 6-6 in FIG. 2, showing the deployed forward bunk assembly and the top frame in the open position.

A cross-section through 6-6 in FIG. 2 (but with the top frame 130 in the upper open position) is shown in FIG. 6. It can now be seen that the left stake 152L includes an upright portion 158 and an angled portion 159. The angled portion 159 includes a pivotable connection 144L to the main upper beam 124 at a location approximately axially aligned with the pivot pin 154L connecting the bunk assembly to the side rail portion 105, such that the left portion of the bunk assembly 150 is pivotable about an axis through the pivotable connection 144L and the pivot pin 154L. The second bunk assemblies 160 have similar left stakes 162L and the description will therefore not be reiterated here.

The pivotable top frame 130 is connected with a hinge member 135 to the main upper beam 124 such that the top frame 130 can pivot between the open position shown in FIG. 6 and a closed position. The top frame 130 preferably includes a cross beam member 136 at the location of each of the bunk assemblies 150, 160. A capture bell 137 is mounted on the distal end of the cross beam members 136 with pivotable connection 144R, which is positioned such that the pivotable connection 144R is approximately axially aligned with pivot pin 154R when the top frame 130 is in the closed position. The capture bell 137 is attached to extension member 138, which is sized such that the capture bell 137 can engage the distal end of the stake 152R when the top frame 130 is moved to the closed position. Similarly, when the right portion of the bunk assembly 150 is pivoted to the non-deployed position, the capture bell 137 can pivot to engage the distal end of the stake 152R. The second bunk assemblies 160 are generally the same in construction regarding the pivotable connection with the top frame 130 and, therefore, the description will not be reiterated here.

Figure 7:
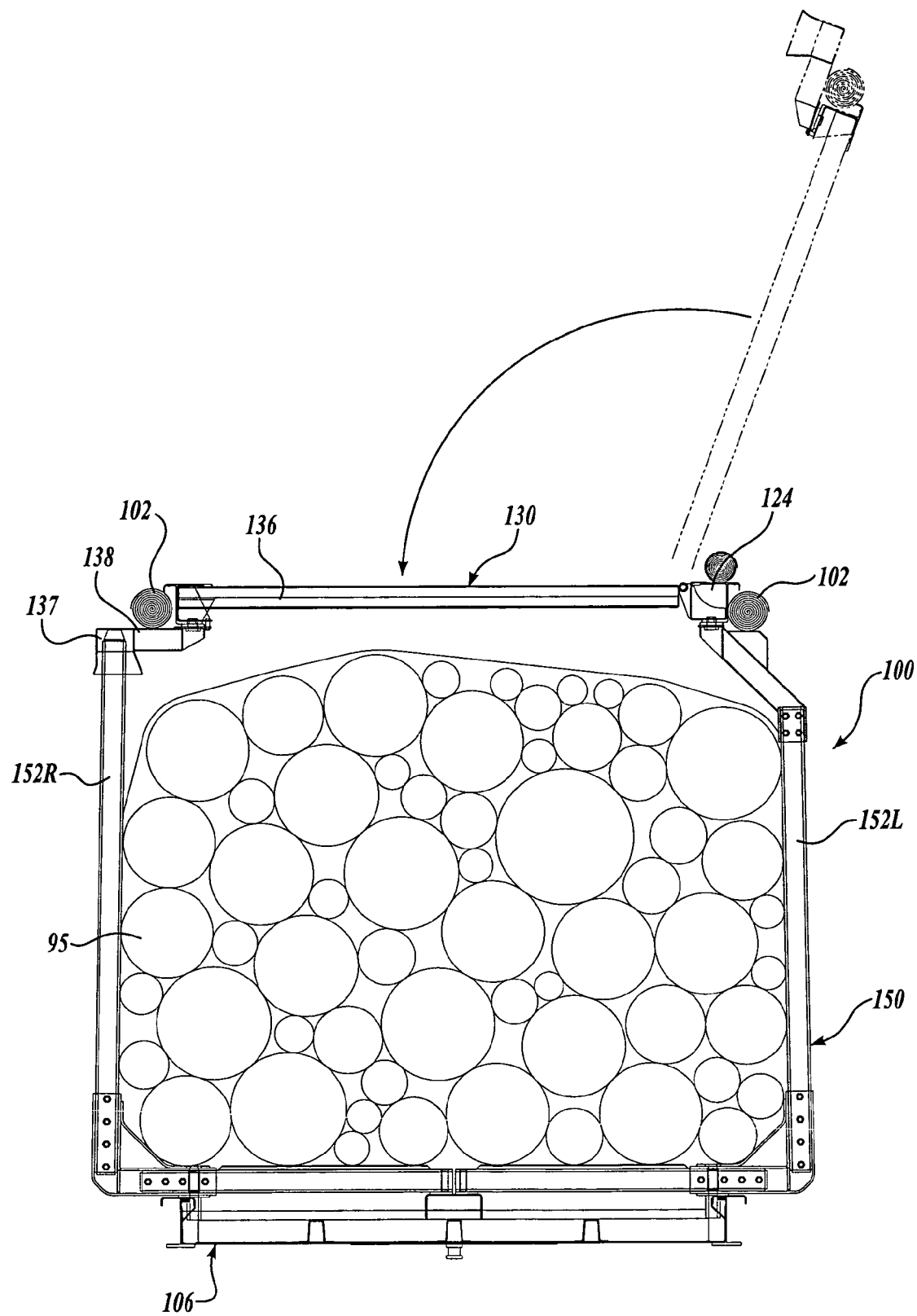
FIG. 7 is a cross sectional view through 6-6 in FIG. 2, showing the loaded forward bunk assembly and the top frame in the closed position.

FIG. 7 shows the same view of the trailer 100 as FIG. 6, but with the top frame 130 moved to the closed position, as indicated by the arrow, and a load of logs 95 retained in the bunk assemblies 150, 160 (only bunk assembly 150 is visible in FIG. 6). It will now be appreciated from FIG. 7 that the bunk assembly 150 (and by similar construction, bunk assemblies 160), cooperatively with the top frame assembly 130, provide a sturdy structural loop surrounding the load of logs 95. In particular, it should be appreciated that, unlike conventional bunk hardware, in the present invention the stakes 152L, 152R, are supported at both the top end and the bottom end. The stakes are not simply cantilevered from the bottom and, therefore, do not need to withstand the same bending loads as conventional bunk stakes. This permits the stakes to be lighter weight, saving costs and weight. In one preferred embodiment, straps (not shown) extend from the top frame 130 to the trailer bed 106, and are clinched tightly to rigidize the connection between the capture bell 137 and the stake 152R.

Figure 8:
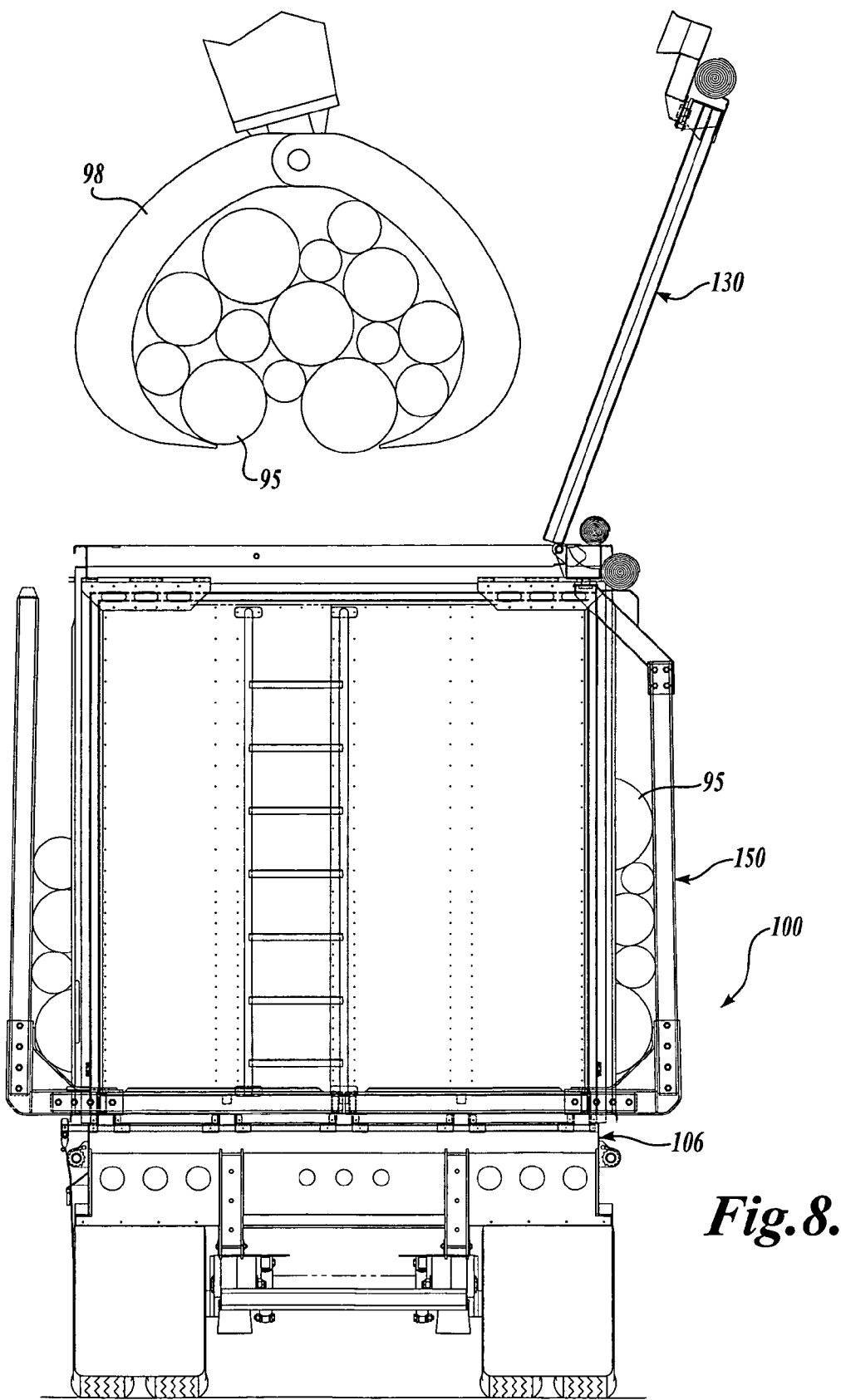
FIG. 8 is a rear view of the trailer shown in FIG. 2, with the top frame in the open position and the trailer being loaded with logs.

FIG. 8 is a rear view of the trailer 100 shown with a loader 98 loading (or removing) a number of logs 95. The top frame 130 is in the open position, which significantly facilitates loading and unloading the logs 95. It will be appreciated from FIG. 2 that the bunk assemblies 150, 160 are spaced apart and, with the top assembly 130 in the open position, the loader 98 can pass between adjacent bunk assemblies 150, 160 to more easily reach the logs 95 and release the logs from closer to the trailer bed 106.

Figure 9:
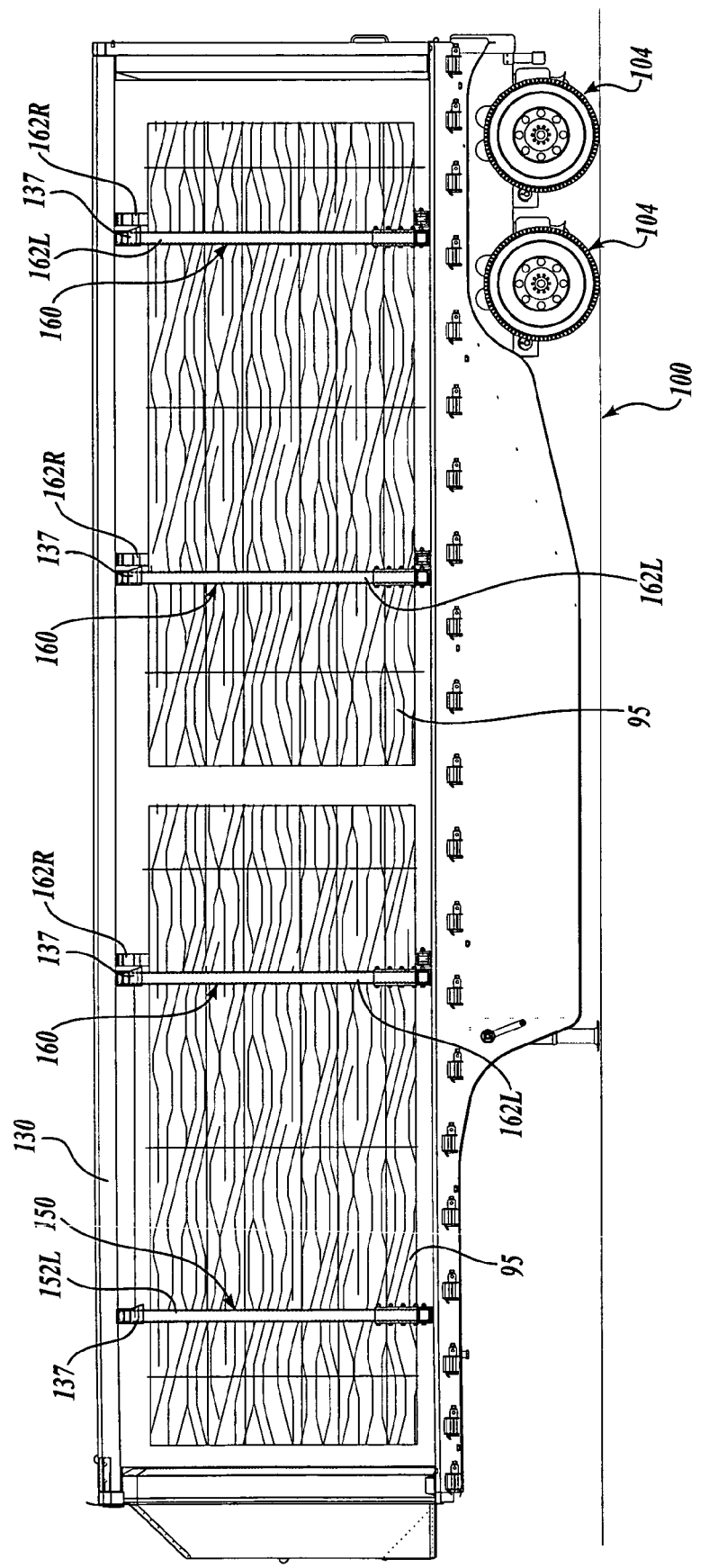
FIG. 9 is a side view of the trailer shown in FIG. 2, with a full load of logs.

FIG. 9 shows a side view of the trailer 100 fully loaded with two stacks of logs 95 retained by the bunk assemblies 150, 160. The top frame 130 is in the closed position, the vertical stakes 152L, 152R, 162L, 162R being supported at both ends, as discussed above. After loading the logs 95, the user simply lowers the top frame 130—for example, using hydraulic, pneumatic, or electric actuators 132. The user may lower the top frame 130 most of the way to the closed position, then position the pivotable capture bells 137 to align with the corresponding stakes 152L or 162L, then lower the top frame 130 the rest of the way to the fully closed position shown in FIG. 9.

Figure 10:
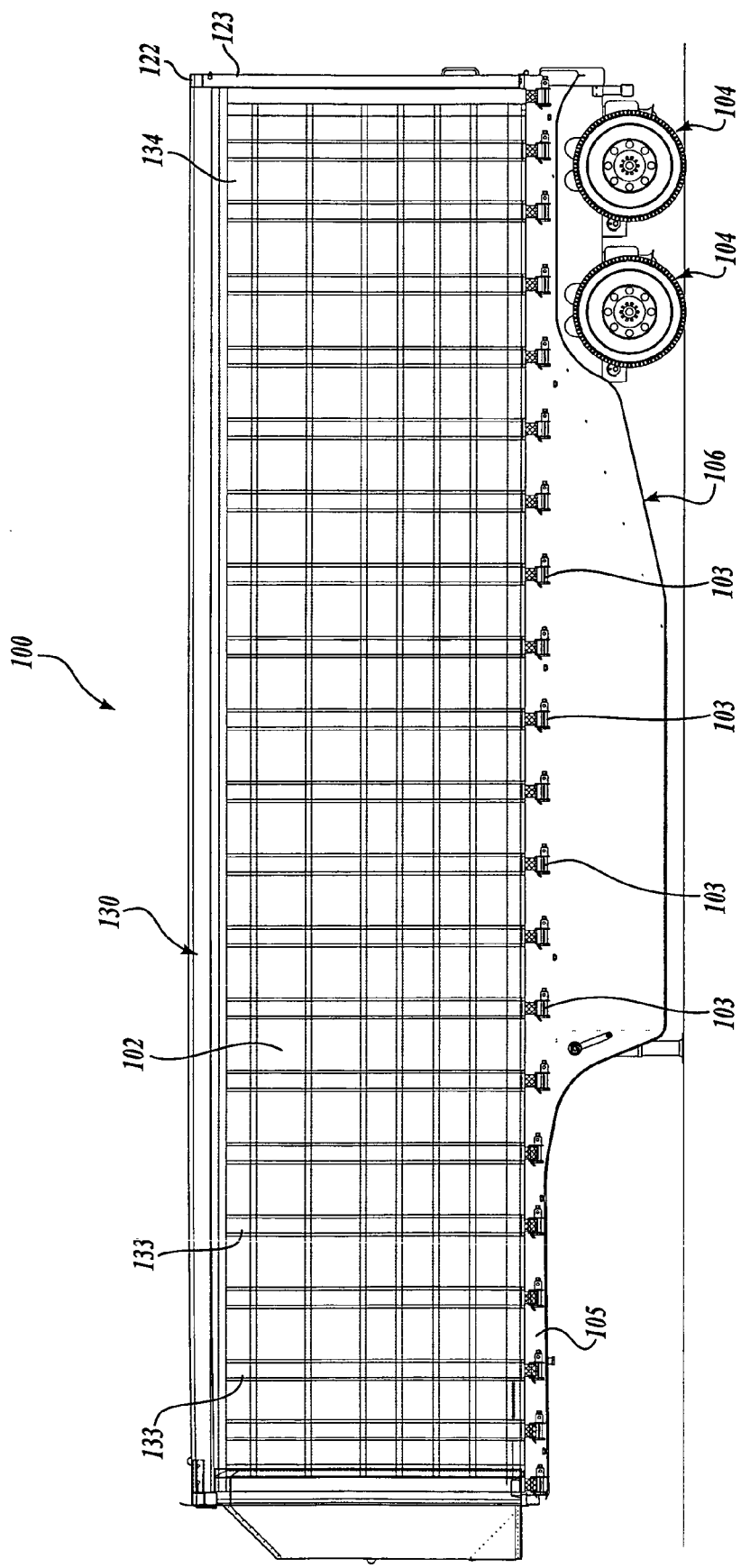
FIG. 10 is a side view of the trailer shown in FIG. 2, configured with the sidewalls deployed for loading with product such as wood chips.

When the logs 95 are not loaded, the bunk assemblies 150, 160 can be pivoted to the non-deployed position shown in FIG. 5 by removing any locking pins and pivoting each side of the bunk assemblies 150, 160 approximately ninety degrees (90°). The distal ends of the bunks 151L, 151R, 161L, 161R may then be locked into place with locking pins and the top frame 130 placed (or retained) in the closed position, as shown in FIG. 10. With the bunk assemblies in the non-deployed position, the sidewalls 102 are deployed (one visible)—for example, as described in incorporated U.S. Pat. No. 4,700,985. In a preferred embodiment, the sidewalls 102 are coiled about a torque tube or rod (not shown) and hydraulically moved to the deployed position, and the torque tube is retained in a flange under the side rail portions 105 of the trailer bed 106.

The deployable sidewalls 102 include a plurality of integral straps 133 that engage the winch assemblies 103 on the trailer bed 106 such that the sidewall 102 can be tensioned in place to provide a load-bearing wall. It will be appreciated that the top frame 130 is open at the top, such that the trailer 100, with the sidewalls 102 deployed as shown in FIG. 10, is in a configuration to be top-loaded with product such as wood chips (not shown) or the like. An optional cover such as a tarp or the like may be provided to close the top frame 130 after loading. As discussed above, the rearward panel member 123 is preferably hingedly attached to the rearward frame portion 122, such that pourable loads such as wood chips may be unloaded by pivoting the trailer 100 as is known in the art.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A trailer comprising:
    a trailer bed mounted on at least one axle, the trailer bed having a left side rail, a right side rail, and a load-carrying portion between the left side rail and the right side rail;
    a plurality of bunk structures, each bunk structure comprising a left bunk assembly mounted to the left side rail and a right bunk assembly mounted to the right side rail, wherein at least one of the left and right bunk assemblies are pivotable between a deployed position and a non-deployed position;
    wherein in the deployed position the left bunk assembly and the right bunk assembly cooperatively define an upwardly-facing U-shaped structure that extends across the load-carrying portion between the left side rail and the right side rail of the trailer bed; and
    further, wherein in the non-deployed position the left bunk assembly and the right bunk assembly substantially overlie the left side rail and right side rail such that the bunk structures do not overlie the load-carrying portion between the left side rail and right side rail of the trailer bed.

2. The trailer of claim 1, wherein the bunk structures comprise a horizontal bunk and a pair of oppositely disposed upright stakes.

3. The trailer of claim 2, wherein at least some of the horizontal bunks extend from one of the right side rail and the left side rail to the other of the right side rail and the left side rail when the bunk assembly is in the deployed position.

4. The trailer of claim 2, wherein both the left bunk assembly and the right bunk assembly are pivotable between the deployed position and the non-deployed position, and further comprising means for locking the left bunk assembly and the right bunk assembly in the deployed position.

5. The trailer of claim 2, wherein the bunk structures are adapted to supporting logs.

6. The trailer of claim 1, further comprising a frame structure attached to the trailer bed, the frame structure having a forward frame portion extending upwardly from a front end of the trailer bed, a rearward frame portion extending upwardly from a rear end of the trailer bed, and a main upper beam extending longitudinally from the forward frame portion to the rearward frame portion.

7. The trailer of claim 6, further comprising a deployable sidewall attached to the frame structure.

8. The trailer of claim 7, wherein the trailer bed further comprises a plurality of winch assemblies, and wherein the deployable sidewall includes a plurality of straps that are positioned to engage the plurality of winch assemblies.

9. The trailer of claim 6, further comprising a top frame pivotably attached to the main upper beam.

10. The trailer of claim 9, further comprising an actuator attached to the top frame.

11. The trailer of claim 10, wherein the actuator is a hydraulic cylinder.

12. The trailer of claim 9, wherein the top frame includes a plurality of pivotable members, each pivotable member being positionable to engage an upper end of one of the plurality of bunk structures.

13. The trailer claim 9, wherein one of the left and right bunk assemblies is pivotably attached to the main upper beam.

14. The trailer of claim 1 wherein in the deployed position the plurality of bunk structures is wider than the trailer bed.

15. The trailer of claim 1, wherein the trailer bed is a drop center trailer bed.

16. The trailer of claim 6 further comprising a rear panel attached to the rearward frame portion at an upper end of the rear panel.

17. A trailer comprising:
    (a) a trailer bed having oppositely disposed first side rail and second side rail portions;
    (b) a frame structure extending upwardly from the trailer bed, the frame structure comprising a forward frame portion, a rearward frame portion, and an elongate beam connecting the forward frame portion to the rearward frame portion; and
    (c) a two-part bunk assembly having an L-shaped first portion pivotably attached to the first side rail and including a first bunk and a first stake, and an L-shaped second portion pivotably attached to the second side rail and including second bunk and a second stake;
    wherein the bunk assembly first portion is also pivotably attached to the elongate beam such that the first portion is pivotable about an axis between the first side rail and the elongate beam, and wherein the bunk assembly first portion and second portion are pivotable between a deployed position wherein the first bunk and second bunk extend over the trailer bed, and a non-deployed position wherein the first bunk and second bunk are positioned parallel to the first side rail and second side rail, respectively.

18. The trailer of claim 17, further comprising a top frame having a first side and a second side, the first side being hingedly attached to the elongate beam such that the top frame can be moved between an open position wherein the second side is disposed above the first side, and a closed position wherein the second side engages the second portion of the two-part bunk assembly.

19. The trailer of claim 18, further comprising first and second deployable sidewalls.

20. A trailer comprising:
   (a) a trailer bed having a first side rail and a second side rail;
   (b) a frame structure extending upwardly from the trailer bed, the frame structure having a forward frame portion, a rearward frame portion, and an elongate beam connecting the forward frame portion to the rearward frame portion;
   (c) a plurality of bunk assemblies attached to, and extending upwardly from, the trailer bed, the bunk assemblies including at least one horizontal bunk and a plurality of upright stakes; and
   (d) a top frame having a first longitudinal side hingedly attached to the elongate beam and a second longitudinal side having a plurality of capture bells, the top frame being movable between an open position wherein the second side is disposed above the first side, and a closed position wherein the top frame is substantially horizontal and the plurality of capture bells engage the plurality of bunk assemblies.

21. The trailer of claim 20, wherein the plurality of bunk assemblies each include a first portion pivotably attached to the first rail, and a second portion pivotably attached to the second rail, such that the first and second portions can be pivoted from a deployed position wherein the at least one horizontal bunk extends transversely over the trailer bed, and a non-deployed position wherein the at least one horizontal bunk is generally parallel with the first and second side rails.

22. The trailer of claim 21, wherein at least some of the horizontal bunks extend from the first side rail to the second side rail when the bunk assembly is in the deployed position.

23. The trailer of claim 22, further comprising means for locking the bunk assemblies in the deployed position.

24. The trailer of claim 21, further comprising at least two deployable sidewalls attached to the frame structure.

25. The trailer of claim 24, wherein the trailer bed further comprises a plurality of winch assemblies, and wherein the at least two deployable sidewalls include a plurality of straps that are positioned to engage the plurality of winch assemblies.

26. The trailer of claim 21, further comprising an actuator attached to the top frame and adapted to move the top frame between the open position and the closed position.

27. The trailer of claim 21, wherein the capture bells are pivotably attached to the top frame with an extension member, such that the capture bells are positionable to engage the bunk assemblies when the bunk assemblies are in the deployed position and when the bunk assemblies are in the non-deployed position.

28. The trailer of claim 21 wherein the plurality of bunk structures is wider than the trailer bed.

29. The trailer of claim 21, wherein the trailer bed is a drop center trailer bed.

30. The trailer of claim 21 further comprising a rear panel attached to the rearward frame portion at an upper end of the rear panel.

* * * * *